United States Patent [19]

Schuller

[11] Patent Number: 4,658,667
[45] Date of Patent: Apr. 21, 1987

[54] GEAR-CHANGE DEVICE FOR A MULTI-RATIO GEAR-CHANGE HUB FOR BICYCLES OR THE LIKE

[75] Inventor: Kurt Schuller, Schweinfurt, Fed. Rep. of Germany

[73] Assignee: Fichtel & Sachs AG, Schweinfurt, Fed. Rep. of Germany

[21] Appl. No.: 820,627

[22] Filed: Jan. 21, 1986

[30] Foreign Application Priority Data

Jan. 22, 1985 [DE] Fed. Rep. of Germany ....... 3501951

[51] Int. Cl.$^4$ ............... F16C 1/10; F16H 29/00; G05G 9/00
[52] U.S. Cl. ............... 74/475; 74/501 R; 74/506; 74/527
[58] Field of Search ............ 74/475, 501 B, 506, 74/527, 577 S

[56] References Cited

U.S. PATENT DOCUMENTS

| 2,534,566 | 12/1950 | Yapp | 74/501 B |
| 3,303,716 | 2/1967 | Wolfe | 74/501 B X |
| 3,595,351 | 7/1971 | Ishida | 74/506 X |
| 3,943,796 | 3/1976 | Hillyer | 74/577 S |
| 3,972,247 | 8/1976 | Armstrong | 74/501 B X |

FOREIGN PATENT DOCUMENTS

| 1033063 | 6/1958 | Fed. Rep. of Germany. | |
| 954131 | 4/1964 | United Kingdom | 74/501 B |
| 2012893 | 8/1979 | United Kingdom | 74/475 |

Primary Examiner—Richard J. Scanlan, Jr.
Assistant Examiner—Nancy J. Stodola
Attorney, Agent, or Firm—Toren, McGeady and Goldberg

[57] ABSTRACT

The invention relates to a gear-change device for a multi-ratio gear-change in bicycles or the like. A gear-change lever of the gear-change device is mounted pivotably on a basis part of the gear-change device and is formed in its middle part as winding body for a gear-change draw cable. The middle part of the gear-change lever is provided with detents with which a ratchet pawl is associated which in turn is pivotably mounted to the basic part of the gear-change device. The ratchet pawl is subject to the return force of the stressed gear-change draw cable and may be provided with its own spring element which is effective in the outward pivoting. The gear-change device comprises only very few parts and can be produced at favorable price with no restriction of functional efficiency.

10 Claims, 1 Drawing Figure

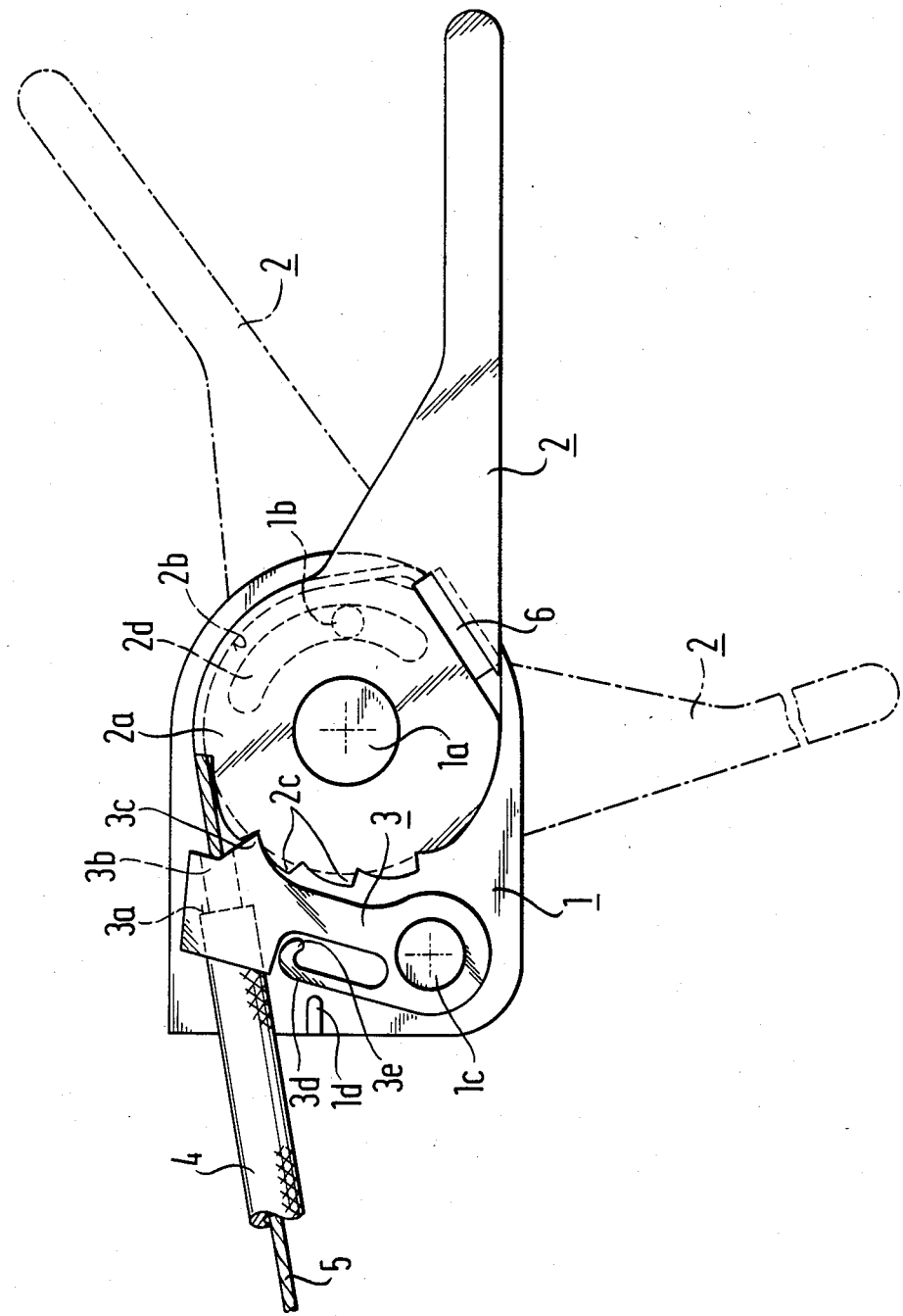

GEAR-CHANGE DEVICE FOR A MULTI-RATIO GEAR-CHANGE HUB FOR BICYCLES OR THE LIKE

BACKGROUND OF THE INVENTION

The invention relates to a gear-change device for a multi-ratio gear-change hub for bicycles or the like.

It has been known to actuate multi-ratio gearchange hubs of bicycles by means of a gear-change device which comprises a stepping device (Fed. German Patent Specification No. 1,033,063). This gear-change device fulfils all operational requirements and is likewise secure in operation, but comprises a relatively large number of components. Although these in fact are made as sheet metal parts, nevertheless the expense as a whole for such a gear-change device is not without significance. The invention is directed toward reducing at least the constructional expense for a gear-change device for a multi-ratio hub without reducing the number of the changeable gear ratios.

SUMMARY OF THE INVENTION

The gear-change device according to the invention controls the gears of the multi-ratio drive hub through a gear-change cable consisting of a cable sheath and a draw cable movable in the cable sheath. The drive hub comprises a return spring which exerts a return force upon the draw cable. The gear-change device comprises a basic body and a gear-change lever mounted pivotably on the basic body. The gear-change lever is provided at a distance from its pivot axis with a securing element for the draw cable. A detent lever is mounted pivotably on the basic body axially parallel with the gear-change lever with spacing from the cable sheath and the pivot axis of the gear-change lever.

The gear-change lever is detainable in several pivotable positions by means of a ratchet device with mutually complementary detent elements on the gear-change lever and the detent lever. The improvement according to the invention is characterized in that the detent lever reaches to the cable sheath and comprises a support element for supporting the cable sheath movably in relation to the basic body.

The invention provides a gear-change device which has only very few parts and can be produced at favorable price, and also renders it possible to increase the number of gear ratios to be controlled.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The FIGURE shows, in slightly diagrammatic form, a plan view of a gear-change device according to the invention for multi-ratio gear-change hubs of a bicycle or the like. The gear-change device is shown in gear position 4, and further gear settings of the gear-change lever are shown in chain lines.

DETAIL DESCRIPTION OF THE DRAWING

In the FIGURE, 1 designates a housing part with which there is associated a lid part (not shown here). A journal $1a$ serving for the pivotable mounting of a gear-change lever 2 is provided standing perpendicularly of the plane of a housing part 1. A further journal $1c$, equipped for the pivotable mounting of a ratchet pawl 3, is provided with its axis parallel to that of the journal $1a$. The above-mentioned components, namely the housing part 1, the gear-change lever 2 and the ratchet pawl 3, are preferably manufactured as synthetic plastics injection molding, and the bearing journals $1a$ and $1c$ and a stop $1d$, to be described later, are formed integrally onto the housing part 1.

The gear-change lever 2 comprises a hub-like middle part $2a$ of approximately circular disc form which is formed as winding body for a gear-change cable, and for this purpose is provided with a cable groove $2b$ extending around a portion of its circumference. In the middle part $2a$ there is provided an arcuate slot $2d$ in which there is received a perpendicularly standing journal $1b$ secured in the housing part $1a$ and serving to limit the range of pivoting of the gear-change lever 2.

Furthermore, the middle part $2a$ of the gear-change lever 2 is equipped to receive a cable nipple 6 on the end of a gear-change draw cable 5 which loops around the middle part $2a$ of the gear-change lever in the cable groove $2b$.

The gear-change draw cable 5 itself is guided over its free length in a cable sheath 4 the end of which is supported on the ratchet pawl 3, which is provided for this purpose with a support face $3a$. As the FIGURE shows, the ratchet pawl 3 is provided in its upper region with a slot $3b$ for the reception of the gear-change draw cable 5, which enters the cable groove $2b$ approximately tangentially.

The middle part $2a$ of the gear-change lever 2 has detents $2c$ on the circumference, facing the ratchet pawl 3. The detents $2c$ are made somewhat in the form of curved teeth, each with a short steep flank in the pulling direction of the gear-change draw cable 5 and an arcuate long transition surface with decreasing radius to the next steep flank.

The ratchet pawl 3 lies with a detent nose $3c$ opposite to these detents $2c$ and engages under the return force of the sheath 4 of the change-speed draw cable 5 to engage in one of the detents $2c$. As may clearly be seen from the FIGURE, on the ratchet pawl 3 there is provided, preferably in one piece, a spring tongue $3d$ which, on radial deflection of the pawl as a result of shifting of the gear-change lever 2, rests resiliently against a fixed stop rib $1d$ on the housing part 1. On inward bending of the spring tongue $3d$ as a result of abutment on the journal $1d$ and simultaneous further movement of one of the detents $2c$ beneath the detent nose $3c$, the end of the spring tongue $3d$ abuts against the pawl. The spring tongue $3d$ is expediently bent over at its free end, for example in the form of a rolled-in end $3e$. This spring tongue end can also be angled. In every case the special configuration of the free end of the spring tongue $3d$ serves to limit the inward deflection of the spring tongue $3d$ in an outward pivoting of the ratchet pawl 3.

The already-mentioned lid part (not shown here) of the gear-change base or housing part 1 can be screwed to the latter, snapped on or even welded. The lid part expediently also consists of an injection-moldable synthetic plastics material. The housing part 1 is fittable by means of a clip (not illustrated here) within reach of the bicycle user, preferably on the handle bar.

As already mentioned, the gear-change device is of very simple construction and has only two movable parts. The return force of the gear-change draw cable sheath is used to press the ratchet pawl 3 against the detents 2c. Thus the detent force is always adapted to the applied gear-change draw cable tension.

If the gear-change draw cable 5 is blocked, for example by force-effected locking of the gear elements in the gear-change hub, until the force-effected locking is released the ratchet pawl 3 is not resiliently stressed against the detents 2c. In the changing of the gears by manual disengagement and overstepping of a detent 2c the gear-change lever 2 can easily jump over one or even more detents 2c. This inconvenience is prevented by the spring tongue 3d with special formation of the tongue end 3e, provided on the ratchet pawl 3. In overstepping of the ratchet pawl 3 the middle part of the spring tongue 3d abuts on the rib or stop 1d and the end part 3e rests on the body of the ratched pawl 3. When the radially highest point of each detent 2c moves past the detent nose 3c of the ratchet pawl 3, the spring tongue 3d abutting with the nose 3e is additionally flexed. The pressure point generated in this way prevents unintentional over-stepping of several gear-change detents 2c.

The above-mentioned form of each gear-change detent 2c ensures that after the pressure point of the spring tongue 3d is overcome the tongue relaxes again and the gear-change lever 2 cannot remain with its gear-change detent 2c in the pressure point as explained above. The entire pivot range of the gear-change lever 2 is determined by the arcuate slot 2d, surrounding the journal 1b, in the lever 2.

Regarding the above-described gear-change device, modified embodiments are possible; thus it is conceivable to form and arrange the ratchet pawl 3 not pivotably but displaceably. The gear-change detents 2c provided on the gear-change lever 2 can have concave, convex or spherical form. The detent effect can also be obtained by means of a detent ball or roll.

Finally a reversal of the system is also possible in a manner in which the gear-change detents are now provided on the radially pivotable ratchet pawl, while the detent nose is fitted on the middle part or hub of the gear-change lever.

It is possible to make the gear-change detents similar to one another, as shown, but it is also possible to make them with different steepnesses from one another in order to permit the detent effect or the further stepping movement to proceed with different forces.

While specific embodiments of the invention have been shown and described in detail to illustrate the application of the inventive principles, it will be understood that the invention may be embodied otherwise without departing from such principles.

What I claim is:

1. A gear-change device for a multi-ratio drive hub of a bicycle which is changeable through a gear-change cable consisting of a cable sheath and a draw cable movable in the cable sheath and which exerts a return spring force upon the draw cable, comprising
   (a) a basic body
   (b) a gear-change lever mounted pivotably about a first pivot axis on the basic body and at a distance from the first pivot axis having a securing element for the draw cable,
   (c) a detent lever mounted pivotably about a second pivot axis on the basic body, with said second pivot axis being spaced from the cable sheath and the first pivot axis and being parallel with the first pivot axis,
   (d) a ratchet device with mutually complementary detent elements on the gear-change lever and the detent lever for detaining the gear-change lever in several pivotal positions,
   (e) a support element provided on the detent lever for supporting the cable sheath movably in relation to the basic body.

2. A gear-change device according to claim 1, wherein the gear-change lever comprises a winding surface curved in arcuate form around the second pivot axis for winding the draw cable, wherein the support element of the detent lever holds the cable sheath guided substantially in the direction of a tangent to the winding surface, and wherein the complementary detent elements are formed so that the detent effect can be overcome manually in both directions of rotation of the gear-change lever.

3. A gear-change device according to claim 2, wherein the detent lever is formed as a ratchet pawl and the winding surface is formed by a hub part of substantially circular disc form of the gear-change lever which comprises on its circumference several tooth notches, arranged at angular distance from one another, with flanks extending obliquely of the radial direction for the engagement of the ratchet pawl.

4. A gear-change device according to claim 3, wherein the tooth notches are formed by curved teeth following one another in the circumferential direction, whose flanks facing the pulling direction of the draw cable are curved in arcuate form.

5. A gear-change device according to claim 4, wherein the arcuate flanks are convexly curved and are longer in the circumferential direction of the hub part than the flanks facing in the pulling direction of the draw cable.

6. A gear-change device according to claim 1, wherein the detent lever carries a spring tongue and the basic body carries a stop co-operating with the spring tongue, on the side of the spring tongue remote from the pivot axis of the gear-change lever.

7. A gear-change device according to claim 6, wherein the stop acts on the spring tongue at a distance from its free end and wherein the spring tongue comprises at its free end an end part extending at a distance from a stop face of the detent lever when the spring tongue is in the unloaded condition, said end part bearing on the stop face when the spring tongue is in the loaded condition.

8. A gear-change device according to claim 7, wherein when the detent lever is in the position holding the detent elements in engagement with one another the spring tongue extends with spacing from the stop of the basic body.

9. A gear-change device according to claim 1, wherein the gear-change lever, for the limitation of its pivoting angle, comprises an arcuate slot curved in circular form about the second pivot axis, and wherein a projection protruding from the basic body engages in the slot.

10. A gear-change device according to claim 1, wherein the basic body, the detent lever and the gear-change lever are made as synthetic plastics injection moldings.

* * * * *